United States Patent [19]
Lindert et al.

[11] Patent Number: 5,071,388
[45] Date of Patent: Dec. 10, 1991

[54] METHOD FOR PROCESSING POULTRY EXTREMITIES APPARATUS THEREFOR

[75] Inventors: Heinrich Lindert, Halle; Josef Schulte, Hamberge, both of Fed. Rep. of Germany

[73] Assignee: Nordischer Maschinenbau Rud. Baader GmbH +Co. KG, Lubeck, Fed. Rep. of Germany

[21] Appl. No.: 537,792

[22] Filed: Jun. 14, 1990

[30] Foreign Application Priority Data

Jun. 16, 1989 [DE] Fed. Rep. of Germany ....... 8907406

[51] Int. Cl.⁵ .................. A22C 21/00; A22C 25/16
[52] U.S. Cl. .................... 452/166; 452/169; 452/170; 452/155
[58] Field of Search ............ 452/166, 169, 170, 149, 452/155, 160, 135, 174

[56] References Cited

U.S. PATENT DOCUMENTS

| | | | |
|---|---|---|---|
| 4,563,791 | 1/1986 | Martin et al. | 452/169 |
| 4,811,456 | 3/1989 | Heuvel | 452/136 |
| 4,811,457 | 3/1989 | Lindert | 452/149 |
| 4,932,102 | 6/1990 | Hazenbroek et al. | 452/136 |
| 4,993,111 | 2/1991 | Martin et al. | 452/169 |
| 4,993,113 | 2/1991 | Hazenbroek | 452/136 |
| 4,993,115 | 2/1991 | Hazenbroek | 452/169 |

FOREIGN PATENT DOCUMENTS 3703836 8/1988 Fed. Rep. of Germany .
WO88/04894 7/1988 PCT Int'l Appl. .

Primary Examiner—Willis Little
Attorney, Agent, or Firm—Fay, Sharpe, Beall, Fagan, Minnich & McKee

[57] ABSTRACT

A method for deboning the extremities of poultry and an apparatus for performing this method serve to process extremities consisting of upper and lower arm or leg members, which members are joined by means of a central joint. The process includes the subsequent steps of severing the skin in the area of the outer condyle down to the bone, freeing the flanks in the area of the central joint, punching out the central joint and extracting the thus produced bone stumps whilst retaining the meat portion, whilst the apparatus comprises a conveyor including holding devices for receiving and holding the extremities to be treated, as well as means for performing these procedural steps.

20 Claims, 2 Drawing Sheets

METHOD FOR PROCESSING POULTRY EXTREMITIES APPARATUS THEREFOR

BACKGROUND OF THE INVENTION

1. Field of the Invention

The invention relates to a method for processing poultry extremities (termed "pieces to be processed" in the following) which contain bones and are in the form of arm or leg members, in each case comprising lower and upper member portions joined together by a central joint, which is partially formed by the proximal condyle of the lower member and by the distal condyle of the upper member; as well as an apparatus for performing the method, this apparatus comprising at least one holding device for the pieces to be processed.

2. Prior Art

A method for stripping off the meat of poultry legs as well as a device for performing such method are known from WO 88/04894. This method is characterised in that one of the condyles is removed, and subsequently the bone extending through the meat is removed by extraction or cutting out. This is done by scraping knives, which perform a movement relative to the bone in the direction of the severed condyle, so that the meat is obtained essentially undamaged after this processing.

Further, a processing installation for poultry parts can be taken from DE-OS 37 03 836, wherein poultry legs consisting of an upper and a lower member are held and centred between nail plates, whereupon the knee joint is punched out and each poultry leg is divided along the whole length, i.e. the bones are split in a longitudinal direction as well and finally the bone halves are lifted out of the meat portions.

While, according to the first mentioned prior art reference merely upper and lower legs of poultry can be processed, the last mentioned prior art installation gives the disadvantage that the relatively small thickness of the bones of chicken legs requires an extremely precise separation in order to be able to release the bone halves without the danger of breaking. A further disadvantage of this separation process is that the bone marrow is distributed over the cutting face such that bone-meal is produced which also "contaminates" the cutting face.

OBJECTS OF THE INVENTION

It is a main object of the invention to suggest a method and an apparatus overcoming the aforementioned disadvantages and safeguarding a highly productive, accurate, effective and easy processing.

It is a further essential object of the invention to suggest a method and an apparatus enabling the deboning of poultry extremities comprising an upper and a lower member without damaging the meat to a considerable extent.

It is yet a further important object of the invention to suggest an apparatus which can be handled in a simple and effective manner.

SUMMARY OF THE INVENTION

In a method for processing poultry extremities containing lower and upper bone member portions joined together by a central joint, these objects are achieved by the procedural steps of a) making incisions in the skin in the area of the distal condyle of the lower member by a radially circular incision made essentially down to the bone;

b) freeing of the flanks in the area of the central joint;

c) removing the central joint; and d) moving the thus produced bone stumps in a direction away from each other by retaining the meat portion.

The positive result to be achieved by this method is essentially based on the fact that the area of the central joint connecting the meat with the bones by means of sinews, tendons and skins is removed, whereby these connections are removed. The loss in meat is minimal, because the meat layer remaining on the bones in this area is comparatively small.

In a preferred embodiment of an apparatus particularly suited for performing the method according to the invention, such apparatus comprises at least one holding device for the pieces to be processed and is characterised by the features that each holding device is arranged to be moved along a processing path and that the means for performing procedural steps a) to d) are arranged along the path of movement of the holding devices.

In order to obtain the possibility of feeding the apparatus in an easy manner, each holding device may preferably be associated with a holding-down means which can be activated for temporarily holding and aligning the pieces to be processed.

According to an advantageous embodiment of the invention, the means for performing procedural step a) can comprise a stationarily arranged cutting device including a pair of knife blades, which have cutting edges directed against the movement direction of the holding devices and are arranged to be displaced against spring force by the pieces to be processed in a plane which extends parallel to the path of movement of the holding devices as well as essentially perpendicular thereto and immediately besides the path of the outer flank of one of the holding elements. This arrangement has the advantage that it is possible to produce a pulling circumferential cut.

For performing the punching step following at a later stage it is necessary to orient the position of the central joint exactly. In order to be able to control this position at the required accuracy, it is advantageous to free the flanks of the central joint, since this enables a direct orienting engagement of the central joint. This freeing can be performed by a stationarily arranged cutting-scraping device including a pair of plough knives which are arranged to move in a controlled manner from below and above against the piece to be processed in the area of the central joint and rest resiliently thereon, said plough knives having scraping edges, which diverge against the direction of movement of the piece to be processed in substantially horizontal planes and which start from a leading frontal cutting edge.

For the purpose of orienting or aligning the freed central joint for the subsequent punching-out into the required position, orienting means may be used which include at least one pressure punch contacting an outer flank of the central joint and having a front face shaped substantially as a hollow cone.

The punching-out can expediently be performed by a punching device including a hollow punch arranged to move in a controlled manner into the path of the pieces to be processed and whose cross-section is substantially adapted to the contour of the condyles partially forming the central joint.

The bone stumps, which, in this manner, may be freed from their essential connections to the meat, may then be pulled out from the meat portions without substantial stressing by tong-shaped gripping means each arranged in the region immediately beside the outer flanks of the holding elements, which gripping means are arranged to move essentially parallel to the longitudinal axis of the pieces to be processed but in opposite directions to each other.

A particularly advantageous embodiment of the apparatus provides that the holding devices are attached to an endless conveyor driven to rotate continuously and including a pair of conveyor belts guided parallel to each other, each of the holding elements forming the holding device being arranged on one of the two conveyor belts such that they oppose each other leaving a space between them; and that the processing means are arranged in the region of the periphery of a deflection wheel of the conveyor, at least the means for performing procedural steps c) and d) being arranged such that, in their active position, they perform an accompanying movement synchronized with the rotational speed of the conveyor.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1a to k give representations of the respective active phases and positions and the corresponding results of the single procedural steps of the method according to the invention, representing in detail in FIG. 1a the introducing phase;

FIG. 1b the orienting and fixing phase;

FIG. 1c and 1d the incision and the severing of the skin in the area of the condyle of the lower leg member;

FIG. 1e and 1f the freeing of the flanks in the area of the central joint during the initial stage and by its result, respectively;

FIG. 1g the orienting of the central joint into the position required for punching;

FIG. 1h the punching-out of the central joint during the initial phase;

FIG. 1i the removing of the bone stumps;

FIG. 1k the result of the sequence of procedural steps; while

DETAILED DESCRIPTION OF THE PREFERRED EMBODIMENTS

Figure 1:
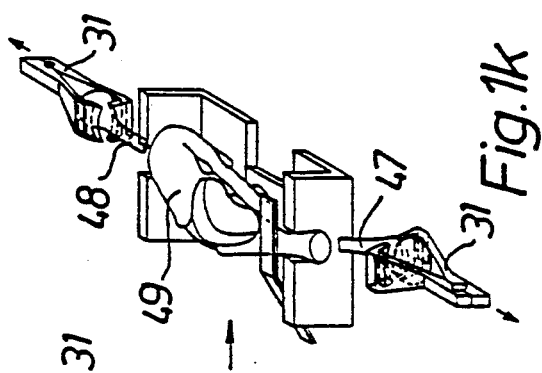
Figure 2:
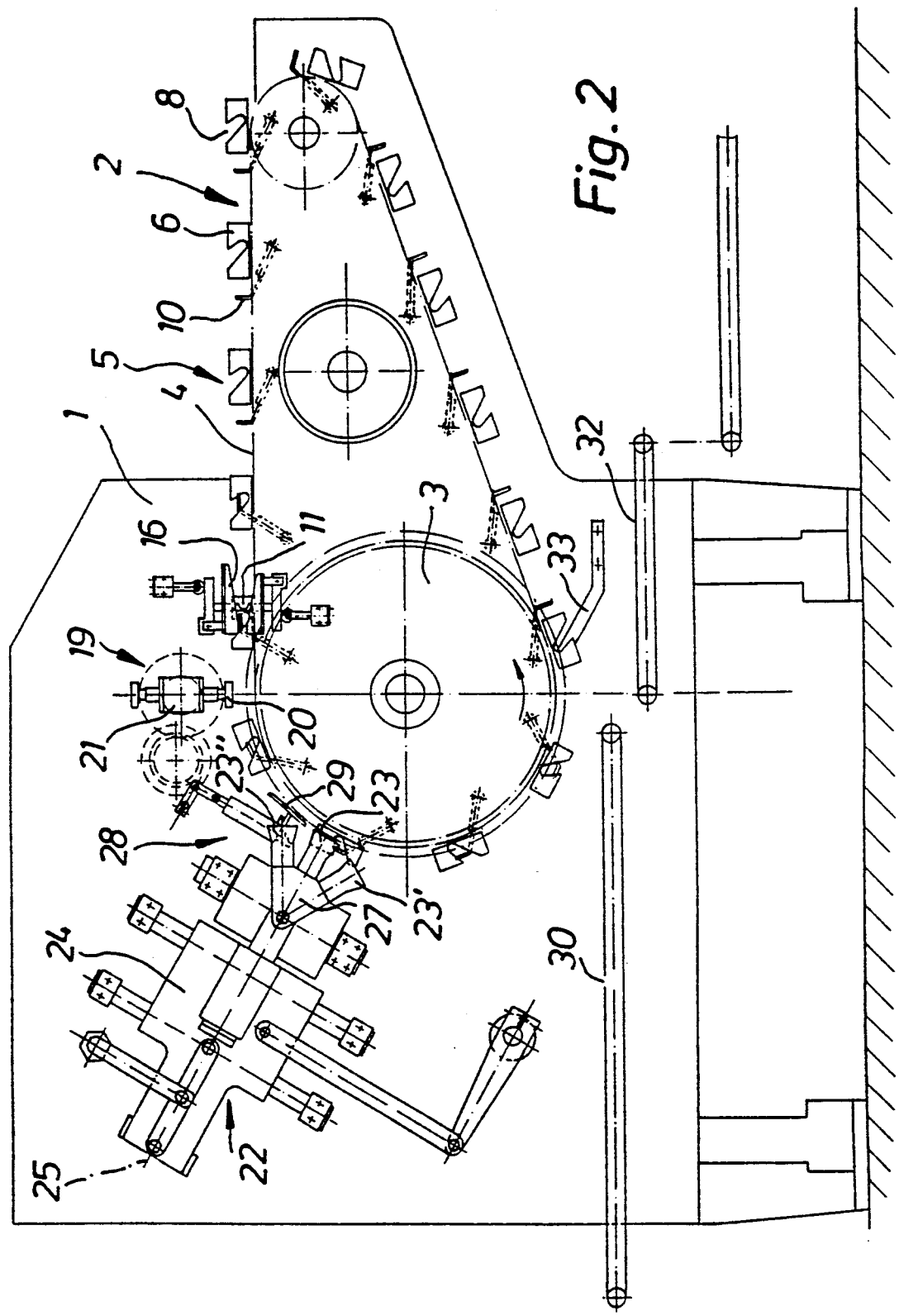
FIG. 2 shows a side view of an industrially utilizable apparatus by way of a simplified representation.

As shown in FIG. 2, the apparatus according to the invention is arranged on a portal-shaped frame 1 whose portal half facing the viewer has been removed for reasons of better and easier viewing of the arrangement of the processing tools. These are installed essentially in the region of the periphery of a deflection wheel 3 of a conveyor 2, the latter including two endless conveyor belts for running parallel to each other and being driven to revolve synchronously. The conveyor 2 is equipped with holding devices 5, which are arranged at even pitch. Each holding device comprises two holding elements 6, which oppose each other in a mirror-like manner leaving a space 7 between them. This results from the left and right holding elements 6, respectively, being associated with a corresponding one of the conveyor belts 4. Each holding element 6 is formed as a support web and has an opening 8 being shaped as an open recess for holding legs 40 to be treated in the area of their condyles 43, 44 lying at the outer sides. The openings 8 are aligned such with regard to each other that an imaginary connection line 9 connecting their centres extends transversally to the movement of the holding devices 5. Each holding device 5 is associated with a holding-down means 10 (cf. also FIG. 1b), which can be activated in a suitable manner in the course of the conveying action.

The sequence of the processing tool starts with a cutting device 11, which is arranged stationarily and comprises a pair of knife blades 12, which are mounted in a pivotable manner about horizontal axes 13 below and above the path of movement of the holding devices 5, respectively, this mounting being such that the holding devices 5 can be pivoted in a plane, which extends perpendicular to their path of movement and immediately besides the path of the outer flank of one of the holding elements 6. As can be taken from FIG. 1c, the knife blades are mounted to cross each other in a scissor-like manner, and they have cutting edges 14 at their brims opposing the direction of movement of the conveyor 2. The cutting edges 14 follow a concave contour which is recessed at the level of the path of the leg bones. The knife blades 12 are held in their basic position by not-shown springs, and they can be displaced with regard to this basic position by the leg 40 to be processed so that a circumferential cut around the lower leg member 41 results in the course of passage of the holding device 5, which cut severes the skin. By a corresponding shape of the cutting edge 14 e.g. by leaving blunt certain areas of the concave contour, it can be safeguarded that the leg sinews remain undamaged. This enables a pulling out thereof from the meat together with the bones.

The subsequent processing tool comprises a cutting-scraping device 15 having a pair of plough knives 16, which are controlled to move against the central joint 46 from below and above. These plough knives 16 are provided with scraping edges 17 diverging against the conveying direction and facing each other. These scraping edges start from a leading frontal cutting edge 18. Controlling thereof is performed in a suitable manner timed in accordance with the passing of the holding devices 5 such that the frontal cutting edge 18 contacts the flanks of the central joint 46 of the leg 14 to be treated, that it divides the meat resting thereupon up to the region of the cartilages and that it pushes apart (cf. FIG. 1e and 1f) this meat in the course of the passage by means of the scraping edges 17 in the direction of the outer ends of the leg 40. As has been indicated in FIG. 2, the cutting-scraping device 15 may also be arranged such that the frontal cutting edges 18 and the scraping edges 17 of the opposing plough knives 16 form a gap narrowing in the direction of movement of the conveyor 2, into which gap the central joint 46 enters. The plough knives 16 in this case are arranged to be pushed apart merely against non-shown springs. As can be taken further from FIG. 2, the cutting device 11 and the cutting-scraping device 15 are provided at almost even positions with respect to the conveyor 2.

Next, there is provided an orienting means 19 coming in contact, as being shown in FIG. 1g, with the central joint 46 thus freed. This orienting means comprises a spring-loaded pressure punch or die 20, which has a hollow cone shape at its front face. The pressure die is attached to a rotational body 21, as can be taken from FIG. 2, which body, by synchronized rotation with the conveyor 2, performs an accompanying movement with this conveyor over a certain period. Thus, the central joint 46 is brought into the position required for an accurate punching process, which position is fixed by the holding-down means 10.

The punching process is performed by a following punching device 22. This is provided with a hollow die 23 and mounted on a carriage or slide 24 which can be pushed along a path extending essentially perpendicular with regard to a central axis 25 of the hollow die 23. This central axis 25 is directed towards the axis of the deflection wheel 3. The hollow die 23 can be moved against the periphery of the deflection wheel 3 and has as abutment an abutment element 26, which is provided in the space 7 at least in the effective area of the punching device 22. The carriage 24 is controlled by means of a non-shown cam drive in such a manner that the hollow die 23, over a certain distance, performs an accompanying movement in synchronism with the revolving speed of the deflection wheel 3. When this accompanying movement ends, a reversing movement is performed which brings the hollow die 23 into the ready position for the next accompanying stroke or movement. The hollow die 23 is approximately kidney shaped, the reason for which is to adapt it to the contour of the condyles of the leg bones participating in the formation of the central joint 46. This hollow die is shortened at its front edge. The punching process is performed during the comovement of the carriage 24 with one of the holding devices 5 by moving the hollow die 23 until its front edge contacts the abutment element 26.

As can be taken from FIG. 2, the hollow die 23 may be arranged on a turret 27 together with e.g. two further hollow dies 23' and 23", respectively, which arrangement enables the processing of legs 40 of different sizes.

An automatic changing of the hollow dies 23, 23' and 23" according to the size of the respective leg 40 to be processed can be controlled by size feeler means 28 including a touch shoe 29, which is brought into contact with the freed central joint 46 and supplies a detected value according to the detected height measurement, which value can be evaluated in an appropriate manner for the accurate and timely switching from hollow die 23 to the corresponding one of hollow dies 23' or 23". The punched-out central joint 46 is positioned in the inner area of the corresponding hollow die and will be ejected shortly before it reaches the end position of the back stroke by means of a non-shown ejector onto a waste transport belt 30 (cf. FIG. 2).

Following this procedural step, tong-shaped gripping means 31, which accompany the holding devices 5 during their revolution along the periphery of the deflection wheel 3 seize the outer condyles 43, 44, which project outwardly from the openings 8 over the holding elements 6, and pull out the bone stumps 47, 48 from the leg meat, which pulling out is done under suitable control, the leg meat being retained by the holding elements 6. By the following opening of the gripping means 31 the pulled bone stumps 47, 48 will also be released to fall onto the waste transport belt 30. The meat portion 49 is at first still fixed by the holding-down means 10, and it will only be released in the area of the lowest reversing point of the conveyor 2, so that it will be supplied to a separate transport belt 32. This process can be secured by a lifting element 33, which moves underneath the meat portion 49 and lifts it in a positive manner due to the conveying movement.

What is claimed is:

1. A method for processing poultry extremities which contain at least bones, meat and skin and are in the form of one of arm and leg members, each one of said members comprising lower and upper member portions, respectively, joined together by a central joint, which joint is partially formed by the proximal condyle of the lower member and by the distal condyle of the upper member, said member comprising the procedural steps of:
   a) making incisions in the skin in the area of said distal condyle of said lower member portion by a radially circular incision made essentially down to the bone;
   b) freeing of the flanks in the area of said central joint;
   c) removing said central joint; and
   d) Moving thus produced bone stumps in a direction away from each other by retaining a meat portion.

2. An apparatus for processing pieces in the form of poultry extremities which contain at least bones, meat and skin and are in the form of one of arm and leg members, each one of said members comprising lower and upper member portions, respectively, joined together by a central joint, which joint is partially formed by the proximal condyle of the lower member and by the distal condyle of the upper member, said apparatus comprising
   a) at least one holding device for the pieces to be processed,
   b) cutting means for making incisions in the skin in the area of said distal condyle of said lower member portion by a radially circular incision made essentially down to the bone;
   c) severing means for freeing the flanks in the area of said central joint;
   d) removal means for removing said central joint; and
   e) extracting means for moving the thus produced bone stumps in a direction away from each other by retaining a meat portion,
wherein said cutting means, said severing means, said removal means and said extracting means are arranged in a sequence to form a processing line and wherein said at least one holding device is arranged to move in a movement direction along a processing path and along said processing line.

3. An apparatus as claimed in claim 2, wherein said at least one holding device has two upwardly projecting holding elements spaced from one another and each being provided with an opening having the shape of an open recess for holding said pieces to be processed in the area of said condyles positioned on the outer sides of said pieces, and wherein the movement of said at least one holding device occurs transversely with regard to an imaginary connection line connecting said openings.

4. An apparatus as claimed in claim 2, wherein said at least one holding device is associated with a holding-down means which can be activated for temporarily holding and aligning said pieces to be processed.

5. An apparatus as claimed in claim 3, wherein said at least one holding device is associated with a holding-down means which can be activated for temporarily holding and aligning said pieces to be processed.

6. An apparatus as claimed in claim 3, wherein said cutting means comprise a stationarily arranged cutting device including a pair of knife blades, which have cutting edges directed against said movement direction of said at least one holding device and are arranged to be displaced against spring force by said pieces to be processed in a plane which extends parallel to said movement direction of said at least one holding device as well as essentially perpendicular thereto and immediately besides the path of the outer flank of one of said holding elements.

7. An apparatus as claimed in claim 2, wherein said severing means comprise a stationarily arranged cutting-scraping device including a pair of plough knives which are arranged to move in a controlled manner from below and above against said piece to be processed in the area of said central joint and rest resiliently thereon, said plough knives having scraping edges, which diverge against said movement direction of said piece to be processed in substantially horizontal planes and start from a leading frontal cutting edge.

8. An apparatus as claimed in claim 2, wherein said removal means comprise a punching device including a hollow punch arranged to move in a controlled manner into the path of said pieces to be processed and whose cross-section is substantially adapted to the contour of said condyles partially forming said central joint.

9. An apparatus as claimed in claim 7, wherein said apparatus comprises means for orienting said pieces to be processed into a position required for punching out said central joint, said orienting means including at least one pressure punch contacting an outer flank of said central joint and having a front face shaped substantially as a hollow cone.

10. An apparatus as claimed in claim 8, wherein said apparatus comprises means for orienting said pieces to be processed into a position required for punching out said central joint, said orienting means including at least one pressure punch contacting an outer flank of said central joint and having a front face shaped substantially as a hollow cone.

11. An apparatus as claimed in claim 2, wherein said extracting means comprise tong-shaped gripping means each arranged in the region immediately beside the outer flanks of said holding elements, which gripping means are arranged to move essentially parallel to a longitudinal axis of said pieces to be processed but in opposite directions to each other.

12. An apparatus as claimed in claim 2, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

13. An apparatus as claimed in claim 3, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

14. An apparatus as claimed in claim 4, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

15. An apparatus as claimed in claim 6, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

16. An apparatus as claimed in claim 7, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

17. An apparatus as claimed in claim 8, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

18. An apparatus as claimed in claim 9, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

19. An apparatus as claimed in claim 10, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

20. An apparatus as claimed in claim 11, wherein said at least one holding device is attached to an endless conveyor driven to rotate continuously and including a pair of conveyor belts guided parallel to each other, each of said holding elements forming said at least one holding device being arranged on one of said two conveyor belts such that they oppose each other leaving a space between them; and wherein said cutting, severing, removal, and extracting means are arranged in the region of the periphery of a deflection wheel of said conveyor, at least said removal and extracting means being arranged such that, in their active position, they perform an accompanying movement synchronized with the rotational speed of said conveyor.

* * * * *